3 Sheets—Sheet 1.

W. H. MITCHEL.
TYPE DISTRIBUTING AND COMPOSING APPARATUS.

No. 9,974. Patented Aug. 30, 1853.

Witnesses
Lemuel W Serrell
Thomas G. Harold

Inventor
Wm H. Mitchel

W. H. MITCHEL.
TYPE DISTRIBUTING AND COMPOSING APPARATUS.

No. 9,974. Patented Aug. 30, 1853.

Witnesses:

Inventor.
Wm. H. Mitchel

W. H. MITCHEL.
TYPE DISTRIBUTING AND COMPOSING APPARATUS.
No. 9,974. Patented Aug. 30, 1853.
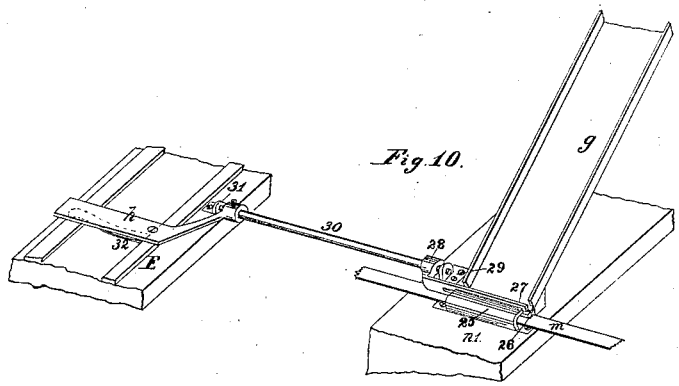
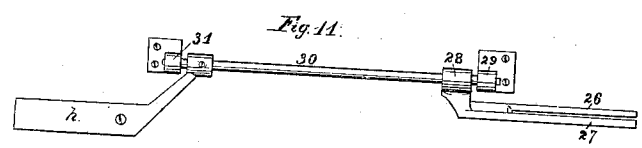
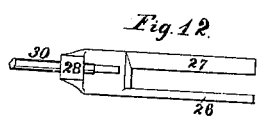
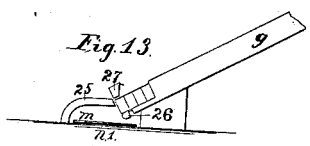
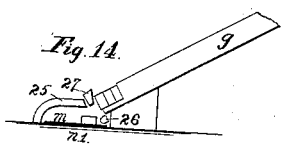

UNITED STATES PATENT OFFICE.

WILLIAM H MITCHEL, OF BROOKLYN, NEW YORK.

IMPROVEMENT IN A MACHINE FOR DISTRIBUTING AND COMPOSING TYPE.

Specification forming part of Letters Patent No. 9,974, dated August 30, 1853.

*To all whom it may concern:*

Be it known that I, WILLIAM H. MITCHEL, of Brooklyn, in the county of Kings and State of New York, have invented, made, and applied to use certain new and useful Improvements in Means for Distributing and Composing Types; and I do hereby declare that the following is a full, clear, and exact description of the construction and operation of the same, reference being had to the annexed drawings, making part of this specification, wherein—

Sheet 1 shows the distributing apparatus. Sheet 2 shows the composing-machine, and Sheet 3 shows details of the composing apparatus.

The like marks of reference designate the same parts in all the figures on these sheets.

The nature of my invention consists in means for distributing the types from the forms and setting them up in rows within grooves, a given letter in each row, with the faces of the types upward and the bottoms of the types in a line, from which grooves the types are removed, each row of a given letter at a time, and placed within slides or conductors which supply them to an apparatus connected with finger-keys. The striking of any given finger-key drops one of the corresponding types on one of a series of belts, which are moved by competent pulleys. This series of belts is elongated as the latter approach the delivery end of the machine, and is combined with a diagonal belt, so that any given type dropped on any one belt takes an equal time to reach the point of delivery—that is, the composing apparatus—and consequently the types reach that point in the same order in which they are dropped by the finger-keys. This is effected by the diagonal belt aforesaid, to which the types are transferred from the series of belts by means of small chutes, this diagonal belt carrying all the types to one point of delivery, where, by means of a conductor and composing-wheel they are set up in a line, ready to be placed in the galley in lines of the required length for transfer to the composing-stone.

Figure 2:
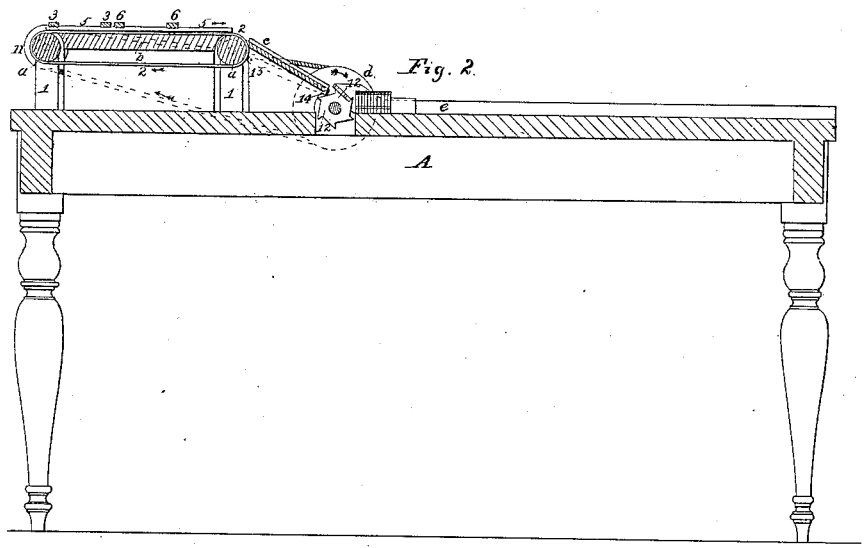
Figure 1:
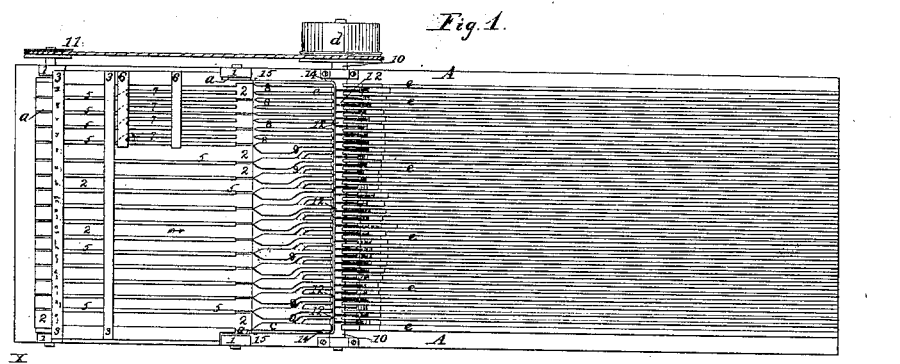
Figure 4:
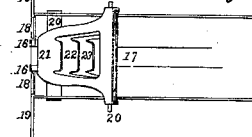

In Sheet 1, Figure 1, is a plan of the distributing-machine. Fig. 2 is a vertical longitudinal section of the same. A is a table of the proper height, receiving small standards 1, carrying rollers *a a*, 1 lying across the table, around which rollers are belts 2, of any suitable material and of any required number. These belts, in passing from one roller to the other, rest on a support or table *b*. 3 3 are cross-pieces secured to the frame of the machine, placed at a sufficient distance above the belts to allow the types to pass under them, having beneath them guide-bars 5, that cover the joints between the belts. 6 6 are second cross-bars carrying guide-bars 7, occupying the space over the middle of each belt, and one end of which is by an incline connected to the bars 5. Any type that may be laid on the belts between the slats 5 is carried by the belts, they rotating in the direction of the arrows toward an inclined plane C, the second bars 7 forming two spaces on one belt for the reception of types. Any desired number of the bars 7 may be used, the other parts being made to correspond, and it will be understood that the inclines that connect the bars 5 and 7 deflect any type that may be dropped on the belts between the bars 5 5 and 3 3 into the proper groove, while the groove that is inclosed at one end by the incline is to be used between the bars 6 6 for the reception of a separate letter. The inclined plane C is shown with a series of straight grooves 8 in a part of its face to conduct the types to the grooves, where they are placed in rows, and another portion is shown with curved grooves to assort thick or thin types. In Fig. 3 one of these grooves is shown endwise to represent an opening beneath a curved bridge 9. Now, if a thin type is dropped on any one belt which communicates with this part of the inclined plane, the type will run end first down the incline beneath the bridge; but if a thicker type is dropped on the belt the bridge 9 deflects the type down the side groove into a separate receiving-groove. The pulley *d* on shaft 10 is to be rotated in the direction of the arrow, and by the pulley and band 11 rotates the rollers *a* and belts 2. The types, as they slide down the inclined plane C and pass into the grooves between the bars *e*, pass into the teeth of pushing-wheels 12 on the cross-shaft 10. Each of these pushing-wheels revolves in a groove or narrow opening in the bed of the machine, and is a little more than half the width of the type, and each type, as it falls from the inclined plane, is raised up and carried over until it comes into a vertical position, when the bottom of the type takes the top edge of the groove or narrow opening aforesaid, in which the wheel revolves, and the next succeeding tooth of the wheel forces the type, and with it the whole row, along the grooves formed by the bars $e$ to the extent of the thickness of the type deposited. The part of the bed of the receiver through which the cam-wheels 12 rotate should be slightly inclined toward the center of the shaft 10, so that the bottom of the type, being arrested by this part of the bed, is forced down the incline in a vertical position by the succeeding tooth 12, the incline preventing the base from sticking, and a small blocking-piece being placed in each groove supports the outer end of the line of types. It will be evident that each tooth of the pushing-wheels being as deep on its face as the thickness of the type it carries, forces the whole line of types along the amount required to deposit its own type. 14 is a check-bar set on centers 15, which lies on the teeth of the pushing-wheels, which, as the wheels rotate, rises opposite the grooves of the inclined plane and holds the types back until the next tooth passes, when it falls and allows one type to pass into any or all of the grooves and on the teeth of the wheels. Instead of separate belts 2, a web or apron might be used of the desired width. The types are to be dropped on the right spaces on their sides with the base of the letter toward the operator, he standing on the side X of the machine, and the bottom of the type is to be toward the incline C. They may be dropped by any convenient means; but I prefer and use the apparatus shown in plan in Fig. 4, sectionally in Fig. 5, and endwise in Fig. 6, that I term the "distributing-stick," which is formed as a thin metal trough to receive one line or more at a time from the composed form. In these figures, $f$ is the metal trough, having stop-points 16, that prevent the types running out at the lower end. 17 is a spring, carrying cross-lips or pushers 18, and extended to form arms 19. It will be evident that the line of types lying in the stick, with the beginning of the line next the stop-points 16, the letter will lie toward the operator, as he holds the stick in an inclined position in his right hand. He should read the line before placing it in the stick. Now, on striking the arms 19 on the cross-bars 3 or 6, with the end of the stick over the proper belt for the first letter in the line, the lips or pushers 18 lift the type over the points 16, and it falls in the correct position on its side on the belt. To prevent more than one type at a time being thus raised, I use keys 21, 22, and 23, the points of which are at successively greater distance from the points 16. These keys move on a center pin 24, and if the finger of the operator be placed on the key 21 only a thin type can be pushed up, and if on the key 22 a thicker one, the key 21 rising to pass the type. The operator of course places his finger on the required key, according to the thickness of the type, and if a very thick type is to be thrown out of the stick none of the keys are used; but a cross-bar 20, on which the keys rest, keeps the next type from rising. It will be necessary to have a small block of metal behind the line of types to keep them in their place and slide down as they are successively removed.

Figures 5, 6, 9:
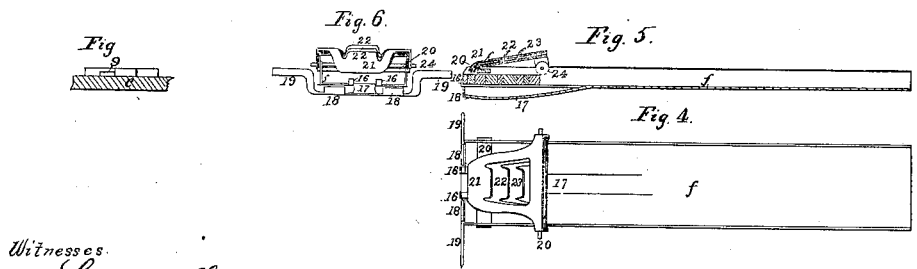

Having thus described the manner in which I distribute a form of types, so as to place each character of letter together in successive rows, I next proceed to describe the method in which I compose any desired form. The types are to be taken in the rows from the distributing-machine by any suitable grab, and either laid away ready for use or taken at once and placed in the proper conductor or chute of a series of chutes $g$, Fig. 7, Sheet 2, which figure is a perspective view of my composing-machine. Fig. 8 is a section of the composing-wheel, and Fig. 9 is a plan of the same. Fig. 10, Sheet 3, is a perspective view of one key and slide or chute. Fig. 11 is a plan, and Fig. 12 a side view, of the key separately; and Figs. 13 and 14 show the manner in which the types are dropped one at a time from the conductors or chutes. B B are the legs of the composing-machine. C is a triangular frame carrying the parts. $k$ is a pulley, to which competent power is to be applied to rotate the shaft $l$, which shaft is supported in bearings 33 and receives around it a series of endless belts $m$, that are made successively longer, commencing at the right-hand end of the machine. These belts are to be formed of tape, leather, india-rubber, or any suitable material, and pass from the top of the shaft $l$ over the rest-bars $n'$ and $n$, around small pulleys $i$, returning around the under side of the shaft. The number of belts in this series corresponds with the number of slides used, which number may be more or less, according to the capacity required for the machine. The types are to be dropped as required on these belts by a means hereinafter described, and by the belts they are carried and passed through chute X to a diagonal belt $o$, which passes around pulleys 37 and 39, supported in standards 38 and 40. P is a bar or support on which the upper part of the belt rests as it is propelled in the direction of the arrow by means of the band 34 from a pulley on the shaft $l$, or similar competent means. 35 are tightening-pulleys on an upright fixed to a slotted slide 36, by means of which the band 34 is guided and tightened. The chutes or conductors X bisect the angle formed by the belts $m$ and belt $o$, so as to partially turn the types and cause them to enter fair on the center of the belt $o$. The length of the longest of the series of belts $m$ is such, compared with the shortest from the base of the series of slides $g$ to the rollers $i$, that the belts $m$, all traveling at the same speed, and the diagonal belt $o$, traveling considerably faster, the types all reach the pulley 39 successively in the same series in which they are dropped from the slides $g$. The speed of the diagonal belt $o$ must be to that of the belts $m$ as the space between the two most distant points of intersection of the belts $m$ with the belt $o$ is to the excess in length of the longest over the shortest of the belts $m$. For instance, if a type is dropped on any one of the shorter belts it is carried by its belt and the belt $o$ past the end of any one of the longer belts before a type subsequently deposited on said longer belt reaches the belt $o$. The types are taken from the belt $h$ at the roller 39 and set up, as hereinafter detailed. E is a key-board with finger-keys $o$, on which the letters dropped by each key are denoted. The key is raised by a spring 32 beneath it, or by a weight, if preferred, the amount of motion of the key being determined by the head of a screw, the shaft of which passes freely through a hole in the key into the key-board. The key $h$ is formed with an arm connected to the short shaft 30, that is supported in bearings 29 and 31 at its ends, so that on depressing the key the shaft is given a partial rotation. 28 is a hub, near the far end of the shaft 30, with a bar formed like a fork, with points 26 and 27. By reference to Fig. 13 it will be seen that the lowest type in the conductor rests against a bearing block or stopper 25 and on the part 26 of the fork, and the belt $m$ travels beneath, (the standard 29 being sufficiently out of the way to allow it to pass.) When the operator strikes any one of the keys $h$, the parts 26 and 27 of the fork are given a partial rotation downward, carrying one type with them below the edge of the blocking-piece 25, and the type being unsupported at its top and resting on the curved part 26, falls over on its side, and the face of the type being toward the operator the belts carry the type with the lower end or foot first to the roller 39. The part 27 of the fork blocks the line of types in its descent, (see Fig. 14,) preventing it from sliding down until the key is relieved and the parts resume the position shown in Fig. 13, when another type is ready to be dropped when needed. The blocking-face of the part 27 of the fork is presented to the types at an angle to their sides in order to free it in rising and prevent its disarranging the types. The types arriving at the roller 39 in the order in which the keys are struck and lying on their sides, as before detailed are slid down a conductor $q$ with the bottom end of the type first between guide-bars $v w$, that form a groove between them of a width corresponding to the width of the types in line. These bars $v$ and $w$ are fixed on the composing-table D. $r$ is a pulley, to which power is to be applied to rotate the shaft 42 in the direction of the arrow on it. This shaft 42 is in bearings 41 and carries on it within the groove between the bars $v w$ a composing-wheel 43 (similar to one of the wheels in the distributing part of the apparatus) with teeth of a depth equal to the thickness of the thickest type that is to be used with the machine. The teeth of this composing-wheel receive the types as they slide down the conductor $q$ and carry them around till they reach the vertical position and deposit them in the groove, the tooth following each type pressing the whole line along to the extent of the thickness of the last type supplied. To regulate the descent of the types I use a wheel S, set on a shaft 44, and supported above the wheel 43 on the standards 41. $t$ is a gear-wheel on the shaft 42, rotating the wheel $u$ and shaft 44 in the direction shown by the arrow. The wheel S is formed with a deep groove around its periphery, receiving on pins 46 fingers 45 set to swing very easily on the said pins, so that as the wheel S rotates they pass over a stop or bar 47 and drop, catching each type successively as it falls and regulating the position of the types, so that they fall correctly into the teeth of the composing-wheel, as seen in Fig. 8, the fingers passing through a slot in the chute $q$, and as the fingers swing freely in the direction contrary to the motion of the wheel, if one of them descends on instead of before a type the latter is not detained, but passes freely on to the next finger. The object of the stop 47 is in the contingency of a finger encountering the upper edge of the foot of a type in such a way as to make it matter of doubt whether it may detain it or to let it pass to throw the finger into such a position as that it shall be free to swing either way. By the means before detailed the types are set up in one continuous line between the bars $v$ and $w$, a sliding block being used to support the outer end of the line of types. From this continuous line an assistant operator slides the amount required for one line in the form and places it in the galley, adding the necessary spaces to fill out the same correctly. F represents the galley in which each line is placed. It has one side adjustable, so as to make it of any desired width, and is furnished with a sliding block, which is pushed back as line after line is placed in the galley. The surface of the galley should be slightly lower at the end farthest from the assistant operator.

Figure 7:
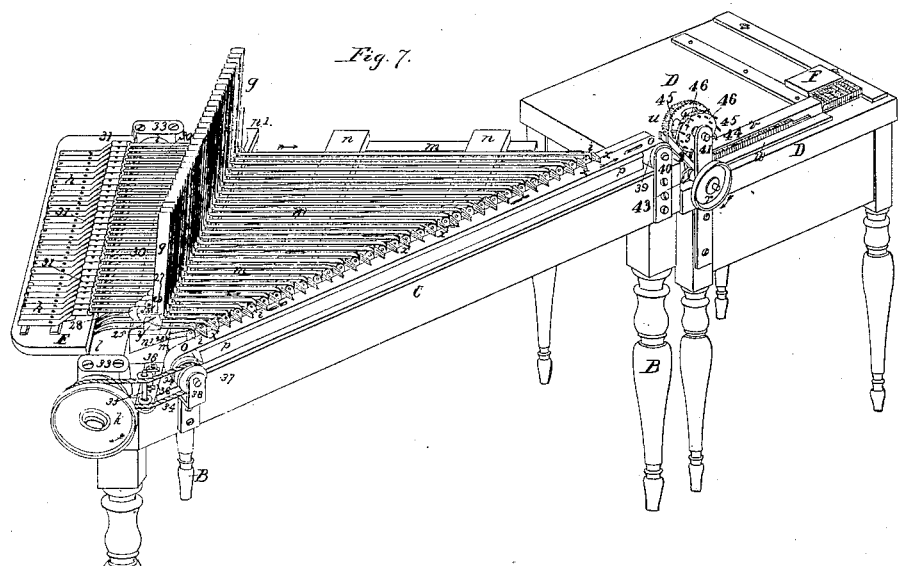
Figure 8:
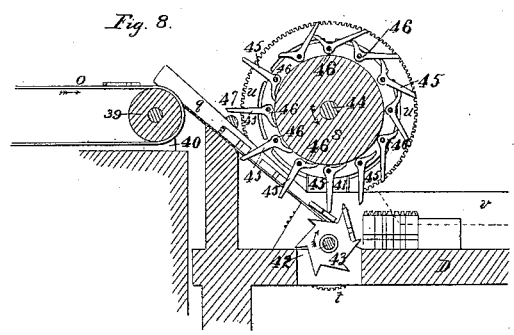
Figure 9:
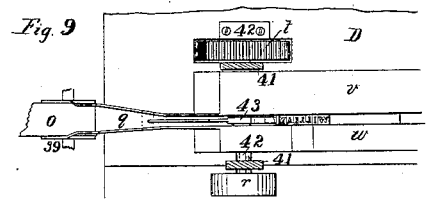

By reference to Fig. 7 it will be seen that the shortest of the series of belts $m$ is provided with a short conductor $y$, in which any type, the conveyance of which is not otherwise provided for in the machine. may be placed by hand when required.

I do not claim arranging the composing apparatus so that each type has to travel nearly the same distance to the point of delivery from the point at which it is dropped, as this has been effected by grooves; but I am not aware of any apparatus in which a combination of belts has been arranged with a view to all the types taking an equal time to travel from the point of deposition to the point of delivery, thereby carrying the types with certainty and avoiding all liability to stick or get into disorder.

I do not limit myself to the precise arrangement of the belts as long as the same end is attained. Neither do I limit myself to the number or size of the parts, as these must be varied to suit the types and the capacity required; but What I desire to secure by Letters Patent is—

1. The feeding belt or belts 2, combined with the inclined plane c, wheels 12, and grooves to distribute the type, in the manner specified.

2. The mode herein shown for forming the distributing-stick, with the points 16, spring 17, lips 18, and keys 21, 22, and 23, so as to drop one type at a time on its side, as specified.

3. The bridge and form of groove to separate the thick from the thin types as they slide down the incline c, as specified.

4. A series of belts of lengths increasing toward the point of delivery of the types, in combination with a diagonal belt to receive and convey the said types from the series of belts to the composing-table or other point in the order in which the types are dropped on the series of belts, as specified.

5. Fitting the key for dropping the types, so that it shall give a partial rotary motion to the shaft 30 to operate on the fork or any analogous device to drop the types.

6. The fork 26 27 and blocking-piece or stopper 25, to drop one type at a time when moved by the key or any similar means, as specified.

7. The composing-wheel 43, to receive and set up the types, either in the composing or distributing apparatus, as specified, and the combination of the said wheel with the fingers 45 on the wheel S, or with the bar 14, to supply said wheel, as specified.

New York, April 10, 1853.

WILLIAM H. MITCHEL.

Witnesses:
 LEMUEL W. SERRELL,
 THOMAS G. HAROLD.